(12) United States Patent
Chander et al.

(10) Patent No.: US 12,425,329 B2
(45) Date of Patent: Sep. 23, 2025

(54) MULTI-CLOUD SITE-SITE SECURE CONNECTIVITY AS A SERVICE

(71) Applicant: Cisco Technology, Inc., San Jose, CA (US)

(72) Inventors: Vijay Chander, San Ramon, CA (US); Raghu Ram Duddumpudi, Bangalore (IN); Ganesh Narayanaswamy, Sunnyvale, CA (US); Sunil Kumar, San Jose, CA (US); Michael Chan, San Jose, CA (US); Praveen Kumar Patnala, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 8 days.

(21) Appl. No.: 18/625,150

(22) Filed: Apr. 2, 2024

(65) Prior Publication Data
US 2025/0112849 A1    Apr. 3, 2025

(30) Foreign Application Priority Data

Oct. 3, 2023  (IN) .............................. 202341066355

(51) Int. Cl.
G06F 15/16      (2006.01)
H04L 9/40       (2022.01)
H04L 45/00      (2022.01)
H04L 45/02      (2022.01)

(52) U.S. Cl.
CPC .............. *H04L 45/04* (2013.01); *H04L 45/38* (2013.01); *H04L 63/20* (2013.01)

(58) Field of Classification Search
CPC .......... H04L 45/04; H04L 45/38; H04L 63/20
USPC ......................................................... 709/238
See application file for complete search history.

(56) References Cited

U.S. PATENT DOCUMENTS

| | | | | |
|---|---|---|---|---|
| 8,074,270 | B1* | 12/2011 | Lordello | H04L 45/52 |
| | | | | 726/13 |
| 8,130,756 | B2* | 3/2012 | Jorgensen | H04L 41/00 |
| | | | | 370/392 |
| 8,457,085 | B2* | 6/2013 | Izaki | H04L 67/51 |
| | | | | 455/420 |
| 9,049,146 | B2* | 6/2015 | Liu | H04L 41/0806 |
| 9,338,816 | B2* | 5/2016 | Liu | H04W 36/008375 |
| 10,374,828 | B2* | 8/2019 | Shanks | H04L 12/4633 |
| 11,089,060 | B2* | 8/2021 | Dewan | H04L 63/0861 |
| 11,303,557 | B2* | 4/2022 | Chandrashekhar | H04L 61/103 |
| 11,394,785 | B2* | 7/2022 | Sung | H04L 67/14 |
| 11,451,596 | B2* | 9/2022 | Heckler | H04L 65/4046 |
| 12,034,811 | B2* | 7/2024 | Sung | H04L 12/6418 |
| 12,063,155 | B2* | 8/2024 | He | H04L 45/36 |
| 2004/0037295 | A1* | 2/2004 | Tanaka | H04L 12/4691 |
| | | | | 370/395.2 |
| 2004/0236855 | A1* | 11/2004 | Peles | H04L 69/40 |
| | | | | 709/227 |

(Continued)

*Primary Examiner* — Moustafa M Meky
(74) *Attorney, Agent, or Firm* — Polsinelli P.C.

(57) ABSTRACT

The present technology provides intercloud connectivity as a service by discovering components of the organization's deployment in various sites, irrespective of the cloud provider, such that two sites can merely be selected along with a few standard options, and the controller can handle the complexity of instantiating a tunnel between the cloud sites automatically. Further, the controller can monitor the health of one or more tunnels between the cloud sites to automatically scale bandwidth up or down.

20 Claims, 9 Drawing Sheets

(56) References Cited

U.S. PATENT DOCUMENTS

| | | | |
|---|---|---|---|
| 2009/0046686 A1* | 2/2009 | Izaki | H04W 8/20 |
| | | | 455/420 |
| 2010/0100767 A1* | 4/2010 | Liu | H04L 43/50 |
| | | | 714/E11.178 |
| 2012/0170477 A1* | 7/2012 | Hieda | H04L 45/586 |
| | | | 370/252 |
| 2015/0245410 A1* | 8/2015 | Liu | H04W 12/04 |
| | | | 370/331 |
| 2017/0180155 A1* | 6/2017 | Shanks | H04L 12/4633 |
| 2018/0077202 A1 | 3/2018 | Xu | |
| 2020/0059420 A1 | 2/2020 | Abraham | |
| 2021/0314258 A1* | 10/2021 | Chandrashekhar | |
| | | | H04L 41/0893 |
| 2022/0329459 A1 | 10/2022 | Sundararajan et al. | |
| 2022/0345400 A1* | 10/2022 | He | H04L 45/54 |
| 2022/0345404 A1* | 10/2022 | Fang | H04L 45/54 |
| 2022/0360633 A1* | 11/2022 | Sung | H04L 12/6418 |
| 2023/0064092 A1 | 3/2023 | Bareket et al. | |
| 2023/0138372 A1 | 5/2023 | Kreger-Stickles et al. | |

* cited by examiner

FIG. 5A

MULTI-CLOUD SITE-SITE SECURE CONNECTIVITY AS A SERVICE

CROSS-REFERENCE TO RELATED APPLICATIONS

This application claims the benefit of and priority to Indian Application No. 202341066355, filed on Oct. 3, 2023, which is expressly incorporated by reference herein in its entirety.

BACKGROUND

Multiple cloud networks can communicate with each other through various networking mechanisms. For example, cloud providers often offer Virtual Private Network (VPN) solutions that allow secure communication between different networks. VPNs establish an encrypted tunnel over the public internet, enabling private communication between cloud networks. Cloud providers can also offer dedicated connections (e.g., AWS Direct Connect, Azure ExpressRoute) that allow organizations to establish a private and dedicated network connection between their on-premises infrastructure and cloud networks. This provides more reliable and consistent connectivity compared to internet-based connections. Some cloud providers offer services for interconnecting different cloud environments. For example, these type of providers allow you to connect to a cloud system from an on-premises data center or another cloud provider.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 5A illustrates an example site connectivity user interface in accordance with some aspects of the present technology.

DETAILED DESCRIPTION

Figure 1:
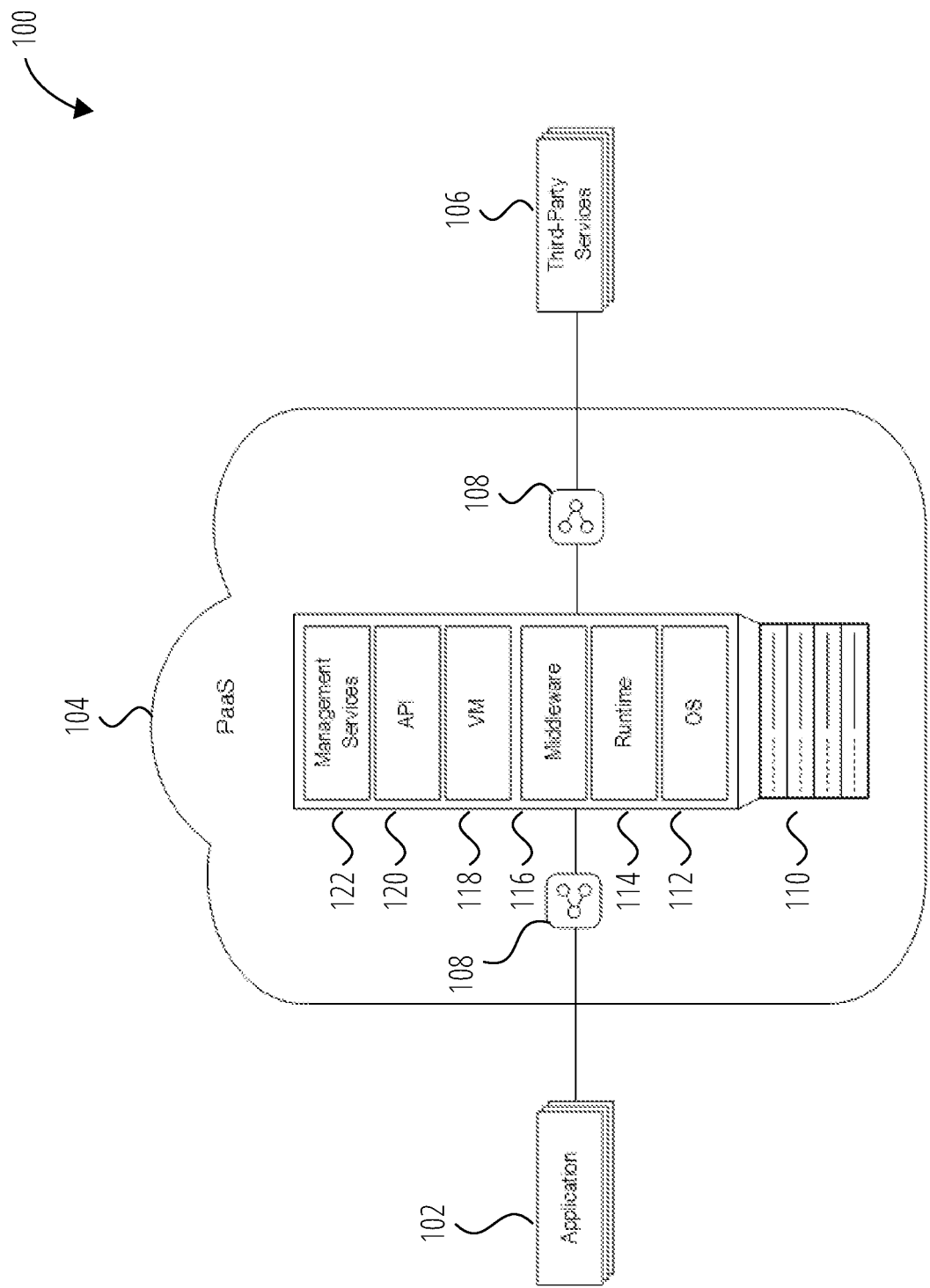
FIG. 1 is a conceptual diagram of a networking environment associated with a cloud security platform that integrates into different cloud providers according to some aspects of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and, such references mean at least one of the embodiments.

Multiple cloud networks can communicate with each other through various networking mechanisms. For example, cloud providers often offer Virtual Private Network (VPN) solutions that allow secure communication between different networks. VPNs establish an encrypted tunnel over the public internet, enabling private communication between cloud networks. Cloud providers can also offer dedicated connections (e.g., AWS Direct Connect, Azure ExpressRoute) that allow organizations to establish a private and dedicated network connection between their on-premises infrastructure and cloud networks. This provides more reliable and consistent connectivity compared to internet-based connections. Some cloud providers offer services for interconnecting different cloud environments. For example, these type of providers allow you to connect to a cloud system from an on-premises data center or another cloud provider.

It's important to consider security measures, such as encryption and access controls, when setting up communication between cloud networks to ensure data privacy and integrity. In order to facilitate communication between cloud networks, inter-region peering can be used if there are resources deployed in different regions of the same cloud provider. Inter-region peering allows virtual networks in different regions to communicate directly with each other. Cloud networks can also communicate with each other through APIs, enabling applications running in one cloud to interact with services or data in another cloud. Additionally, internet communication can be used, but internet connections are less secure compared to private connections. In Software-Defined Networking (SDN) technologies, enable dynamic and programmable network configurations are enabled that allows for more flexible and scalable communication between cloud networks.

Connectivity between cloud networks comes with various challenges. As the scale of cloud deployments grows, it becomes challenging to manage and scale the network infrastructure to handle increasing amounts of data traffic. Solutions must be scalable to accommodate growth. To compound this problem, cloud environments are dynamic, with resources being added or removed as needed. Keeping network configurations up-to-date and adapting to changes in the cloud environment poses a challenge. Organizations need effective monitoring tools and processes to quickly identify and address any issues that arise. Moreover, configuring and managing connections between cloud networks is a complex process, particularly when dealing with multiple cloud providers or hybrid cloud environments. The complexity increases with the number of interconnected networks, and maintaining visibility into network traffic and troubleshooting connectivity issues across multiple cloud networks is needed. Addressing these challenges requires careful planning and ongoing management. What is needed is systems, methods, and techniques for dynamically and easily managing multi-cloud systems connectivity.

Further complicating the challenge of providing connectivity between cloud networks is that some networks utilize multiple different cloud providers within the overall network. In addition to the challenges addressed above, a network administrator that is trying to connect a first cloud site hosted by a first cloud provider and a second cloud site hosted by a second cloud provider will also need to navigate application programming interfaces (APIs), technologies, and protocols that are specific to the different cloud providers.

The present technology addresses these problems by providing connectivity to the data center, hybrid, and/or public clouds by providing connectivity as a service. For example, applications may be running on the cloud network, on the premises, or both, and network connectivity as a service serves as a basis for providing secure communications between those applications. In order to facilitate connectivity as a service, the methods, systems, and techniques herein provide dynamically generated site-to-site connection between multiple cloud networks, which can make the process of connectivity simple, efficient, and secure.

As addressed herein, the present technology provides intercloud connectivity as a service by discovering components of the organization's deployment in various sites, irrespective of the cloud provider, such that two sites can merely be selected along with a few standard options, and the controller can handle the complexity of instantiating a tunnel between the cloud sites automatically. Further, the controller can monitor the health of one or more tunnels between the cloud sites to automatically scale bandwidth up or down.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Overview

Disclosed are systems, apparatuses, methods, and computer readable mediums for receiving a first input at a user interface to initiate an automatic set up of tunnel for communication between a first site and a second site, receiving second inputs in the user interface to select devices populated in a list for selection, where the second inputs are effective in selecting the devices at the first site and the second site which will form respective connection points for a site-to-site connection, where the devices are routers or gateways to which a respective router is associated, receiving third inputs in the user interface, where the third inputs are effective to input settings for use in connecting the selected devices at the first site and the second site, causing the site-to-site connection to be created between the one or more network sites using the settings, where the site-to-site connection is a tunnel between the selected devices at the first and second sites, where the creating the site-to-site connection includes interacting with the first site using first site-specific protocols and configurations and interacting with the second site using second first site-specific protocols and configurations.

The method may also include where the devices are populated in the list for selection by a controller having access to one or more network sites.

The method may also include the method further includes generating a template for site-to-site connections between the first site and the second site, the template is created from the input settings for use in connecting the selected devices at the first site and the second site, the first site-specific protocols and configurations, and the second site-specific protocols and configurations.

The method may also include where settings for use in connecting the selected devices at the first site and the second site include a selection of BGP, and/or IP Sec.

The method may also include the method further includes receiving one or more metrics from the devices at the first site and the second site, where the one or more metrics provide information about a health and a load for an existing instance of tunnel between the selected devices at the first and second sites, analyzing a sample of the one or more metrics to determine a trend that traffic will fall below a threshold level, and dynamically removing the existing instance tunnel based on a determination of the trend that the traffic will fall below the threshold level.

The method may also include the method further includes receiving one or more metrics from the devices at the first site and the second site, where the one or more metrics provide information about a health and a load for an existing instance of tunnel between the selected devices at the first and second sites, analyzing a moving window of one or more metrics as a first sample of the one or more metrics to determine a trend in traffic levels and connection health for the existing instance of the tunnel between the selected devices at the first and second sites, and determine whether to create a new instance of the tunnel or remove the existing instances of the tunnel based on the analysis of the moving window of sample collection to prevent bouncing when handling bursting traffic trends.

The method may also include the method further includes when BGP is part of the settings for use in connecting the selected devices at the first site and the second site, the site-to-site connection is learned and added to an equal cost multi-path (ECMP) routing table. Other technical features may be readily apparent to one skilled in the art from the following figures, descriptions, and claims.

The method may also include the method further includes receiving one or more metrics from the devices at the first site and the second site, where the one or more metrics provide information about a health and a load for an existing instance of tunnel between the selected devices at the first and second sites, analyzing a first sample of the one or more metrics to determine a trend that traffic will exceed a threshold level, and dynamically creating a second tunnel between the first site and the second site using the template based on a determination of the trend that the traffic will exceed a threshold level.

The method may also include the method further includes determining whether any traffic within the existing instance of the tunnel is stateless traffic, routing traffic through a remaining tunnel when the traffic is stateless traffic, and removing the existing instance of the tunnel from an ECMP route table prior to tearing down the tunnel when the traffic is stateful traffic.

The method may also include the method further includes determining, from the moving window of one or more metrics, that a first application at the first site experiences a burst of traffic at one or more time periods, determining a head room needed for handling the burst of traffic from the first application, determining that one or more existing instance of the tunnel is capable of handling the head room prior to removing the tunnel.

The method may also include the method further includes automatically configuring a network address translation (NAT) by the controller to prevent conflicts from overlapping IP addresses at the first site and the second site, where the NAT is included in the template for site-to-site connections between the first site and the second site.

In one aspect, a computing system includes at least one processor. The computing system also includes a memory storing instructions that, when executed by the at least one processor, configure the system to receive a first input at a user interface to initiate an automatic set up of tunnel for communication between a first site and a second site, receive second inputs in the user interface to select devices populated in a list for selection, where the second inputs are effective in selecting the devices at the first site and the second site which will form respective connection points for a site-to-site connection, where the devices are routers or gateways to which a respective router is associated, receive third inputs in the user interface, where the third inputs are effective to input settings for use in connecting the selected devices at the first site and the second site, cause the site-to-site connection to be created between the one or more network sites using the settings, where the site-to-site connection is a tunnel between the selected devices at the first and second sites, where the creating the site-to-site connection includes interacting with the first site using first site-specific protocols and configurations and interacting with the second site using second first site-specific protocols and configurations.

In one aspect, a non-transitory computer-readable storage medium, the computer-readable storage medium including instructions that when executed by at least one processor, cause the at least one processor to receive a first input at a user interface to initiate an automatic set up of tunnel for communication between a first site and a second site, receive second inputs in the user interface to select devices populated in a list for selection, where the second inputs are effective in selecting the devices at the first site and the second site which will form respective connection points for a site-to-site connection, where the devices are routers or gateways to which a respective router is associated, receive third inputs in the user interface, where the third inputs are effective to input settings for use in connecting the selected devices at the first site and the second site, cause the site-to-site connection to be created between the one or more network sites using the settings, where the site-to-site connection is a tunnel between the selected devices at the first and second sites, where the creating the site-to-site connection includes interacting with the first site using first site-specific protocols and configurations and interacting with the second site using second first site-specific protocols and configurations.

Other technical features may be readily apparent to one skilled in the art from the following figures, descriptions, and claims.

Example Embodiments

Cloud network providers include various companies such as Google, Apple, Amazon, Microsoft, DigitalOcean, Vercel, Alibaba, Netlify, Redhat OpenShift, Oracle, and many other entities. Each cloud provider offers a range of services, from foundational infrastructure, which is referred to Infrastructure as a Service (IaaS), platforms for application development and deployment, which is referred to as platform as a service (PaaS), and fully managed software applications, which is referred to as software as a service (SaaS). Cloud providers maintain a network of geographically distributed data centers that host servers, storage, and networking equipment and allowing customers to deploy resources in proximity to their target audience for improved performance and redundancy, including content delivery networks (CDN) and edge compute services.

Virtualization technology is a foundational aspect of cloud providers and enable the creation of virtual instances of servers, storage, and network resources within a geographic region. Cloud providers also deploy resource orchestration tools manage the dynamic allocation and scaling of these virtual resources based on demand. Fundamentally, cloud providers establish robust, high-speed connections between their data centers and forming a global network backbone. This backbone ensures low-latency communication and facilitates data transfer between different regions.

Conventional security within cloud providers deploy a range of security measures, including encryption, firewalls, identity and access management, and compliance certifications, to safeguard customer data and ensure the integrity of their services. Cloud services are designed to be elastic, allowing customers to dynamically scale resources up or down based on demand to handle varying workloads efficiently.

Cloud providers offer various managed services, such as databases, machine learning, and analytics, runtimes, and other aspects that allow customers to leverage advanced functionalities without the need for deep expertise in those domains. Various application programming interfaces (APIs) can be exposed by a cloud provider that enable users to programmatically interact with and manage their resources and allow integration with third-party tools and the automation of various tasks.

Fundamentally, in past server architectures, a server was defined with a fixed internet protocol (IP) address. In cloud-based computing, IP addresses are dynamic and enable the resources within the cloud providers. Cloud environments require dynamic scaling to accommodate varying workloads and dynamic IP addresses allow for the automatic allocation and release of addresses as resources are provisioned or de-provisioned. The dynamic addresses also allow service elasticity to respond to increasing or decreasing resources, cost efficiently, automation and orchestration of tools within the cloud integration and deployment environment, load balancing, high availability and failover, adaptable network topology, and increase resource utilization.

Cloud security is a fundamental issue as customers typically may deploy resources and integrate into resources of different cloud providers. While the clouds have a generic infrastructure configuration with a spine network topology that routes traffic to a top-of-rack (TOR) switch and servers within the racks, clouds are still configured differently and have different requirements. For example, some cloud providers emphasize different geographical markets; cloud providers can emphasize different business segments (e.g., healthcare, government, etc.) and configure services according to their intended market.

Cloud security has become an important aspect of networking today because there are significant challenges. For example, data breaches are a significant concern in the cloud because unauthorized access to sensitive data, either through misconfigurations or cyberattacks, can lead to data exposure and compromise the confidentiality of information. Misconfigurations of cloud services, such as incorrectly configured access controls or insecure storage settings, can create vulnerabilities and may expose data to unauthorized users or attackers.

Another important aspect of cloud security is identity management. Improper management of user identities and access privileges can result in unauthorized access. Inadequate or improperly implemented encryption can lead to data exposure. This includes data in transit, data at rest, and data during processing. Ensuring end-to-end encryption is crucial for maintaining data confidentiality.

Cloud providers use shared infrastructure and technologies. If a vulnerability is discovered in a shared component, multiple clients could be affected simultaneously. Regular security updates and patches are essential to mitigate this risk, and there is an increased market for third-party services that integrate into cloud provider services.

Organizations may fail to conduct thorough due diligence when selecting a cloud service provider. Inadequate assessment of a provider's security measures, compliance standards, and data protection practices can result in security gaps.

The evolving landscape of cybersecurity introduces new threats and attack vectors. Cloud security solutions must continuously adapt to address emerging threats, such as zero-day vulnerabilities and advanced persistent threats (APTs). These attacks can come from many different sources, and monitoring these threats can be too difficult for entities.

The cloud is dynamic, connected and encrypted. Customers of cloud providers primarily care about their business operations and not the infrastructure behind the business operations. In the current environment, customers of cloud service providers need to implement instruction protection services (IPS), instruction detection services (IDS), web application firewalls (WAF), as well as provide egress security. Customers may also need to implement data lost prevention services (DLP) to comply with sensitive information requirements.

Connectivity to the data center between hybrid and/or public clouds can present some challenges when providing connectivity as a service. For example, applications may be running on the cloud network, on the premises, or both, and network connectivity as a service serves as a basis for providing secure communications between those applications. In order to facilitate connectivity as a service, the methods, systems, and techniques herein provide dynamically generated site-to-site connection between multiple cloud networks, which can make the process of connectivity simple, efficient, and secure.

Combining multicloud networking, automation, and cloud-native network security as a service offers several advantages. Multicloud networking allows for resilience and redundancy by distributing workloads across multiple cloud platforms, reducing the risk of downtime due to outages in a single provider. Automated failover mechanisms can quickly switch between clouds, ensuring continuous operations. Leveraging multiple clouds enables organizations to select the best services or features from different providers to optimize performance, scalability, and cost-effectiveness. Automation streamlines the process of managing these services across clouds. Multicloud setups also provide flexibility, allowing businesses to scale resources up or down based on demand. Automation facilitates the rapid deployment of resources and scaling operations across multiple clouds as needed. Multicloud networking also provides security enhancement. Cloud-native network security ensures that security measures are specifically designed for the cloud environment. Automation can enable the quick implementation of security protocols and policy across various cloud platforms, ensuring consistency and reducing vulnerabilities. Moreover, by automating processes like resource provisioning, scaling, and load balancing, organizations can optimize their resource usage and control costs more effectively across multiple clouds. Automation also assists in enforcing consistent compliance and governance policy across different cloud environments, ensuring that regulatory requirements are met uniformly. In essence, the combination of multicloud networking, automation, and cloud-native network security provides a more robust, flexible, and secure infrastructure that can adapt to changing business needs while optimizing performance and resource management across different cloud environments.

However, managing resources and networks across multiple clouds can be complex. Automation simplifies tasks such as network configuration, monitoring, and management, making it easier to handle diverse cloud infrastructures.

FIG. 1 is a conceptual diagram of a networking environment 100 associated with a cloud security platform that integrates into different cloud providers according to some aspects of the disclosure. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

In some aspects, the networking environment 100 includes a plurality of applications 102 that are connected to a cloud security platform 104 that is configured for various aspects of cloud security. The cloud security platform 104 comprises a compute layer that is configured to discover applications and network resources, deploy cloud-based firewalls and management, and provide multi-cloud policy and control from a single end point.

The applications 102 include various forms, such as distributed cloud-based applications, edge-based applications (e.g., webapps), desktop-based applications, mobile phone applications, and so forth. The third-party services 106 include various services, such as cloud service providers and other services that are integrated into the cloud security platform 104. For example, the cloud security platform 104 may be configured to use different services for specialty functions that are consistent for each customer of the cloud security platform 104. Non-limiting examples of different services include various types of communication services (e.g., mail servers, communication platforms, etc.), security-oriented services (e.g., monitoring services such as Splunk), search services, storage services (e.g., relational databases, document databases, time-series databases, graph databases, etc.), authentication services, and so forth.

The cloud security platform 104 is configured to be deployed within various infrastructure environments in a Platform-as-a-Service (PaaS) manner. The cloud security platform 104 includes networking infrastructure 108 for connecting the application 102 to the cloud security platform 104. The cloud security platform 104 includes a plurality of servers 110 that are geographically distributed, with each server being managed by with various operating systems (OS) 112, runtimes 114, middleware 116, virtual machines (VM) 118, APIs 120, and management services 122. In some aspects, the cloud security platform 104 includes a runtime 114 which refers to the environment that the middleware 116 will execute within to control various aspects of the cloud security platform 104. For example, the VMs 118 may be Kubernetes containers and the middleware 116 may be configured to add or remove hardware resources within cloud providers dynamically.

The cloud security platform 104 also exposes one or more APIs 120 for allowing the applications 102 to interact with the cloud security platform 104. The APIs 120 enable a customer to surface information, interact with information within the cloud security platform 104, and perform other low-level functions to supplement the security services of the cloud security platform 104. The API 120 is also configured to integrate with other third-party services (e.g., the third-party service 106) to perform various functions. For example, the API 120 may access a customer's resources in a cloud service provider (e.g., a third-party service 106) to monitor for threats, analyze configurations, retrieve logs, monitor communications, and so forth. In one aspect, the API 120 integrates with third-party cloud providers in an agnostic manner and allows the cloud security platform 104 to perform functions dynamically across cloud providers. For example, the API 120 may dynamically scale resources, allow resources to join a cluster (e.g., a cluster of controller instances), implement security rules from the cloud security platform 104 into the corresponding cloud provider, and other functions that enable a cloud-agnostic and service-agnostic integrated platform. For example, in some cases, the API 120 is configured to integrate with other security services to retrieve alerts pertaining to specific assets to reduce exposure to malicious actors.

The cloud security platform 104 also includes management services 122 for managing various resources of a customer. In some aspects, the management services 122 can manage resources including a controller (e.g., the controller 210 in FIG. 2), data resources (e.g., a data plane 270 in FIG. 2), and various integrations (e.g., a gateway 250, third-party services 252, cloud providers 254 in FIG. 2). For example, the management services 122 may allow the customer to manage various third-party resources such as a cloud-based relational database, a cloud-based document database, a cloud-based storage service (e.g., various implementations of the S3 API) and so forth.

In one aspect, the management services 122 include an onboarding user experience that connects to various cloud providers (e.g., using the API 120) and allows onboarding of different cloud resources. The management services 122 also provides a cloud-agnostic approach to managing resources across different cloud providers, such as scaling up identical resources in different regions using different cloud providers. As an example, some cloud providers do not have a significant presence in the far east, and the management services 122 are configured to activate similar resources in a first geographical region (e.g., in Europe) and a second geographical region (e.g., Asia) with similar configurations in different cloud providers.

The cloud security platform 104 is configured to provide security across and within cloud providers in different contexts. For example, the cloud security platform 104 provides protection and security mechanisms in different flows. The cloud security platform 104 is configured to provide varying levels of protection based on flow, packet, encryption, and other mechanisms. In one aspect, the cloud security platform 104 is configured to protect forwarding flows and packet flows.

Forwarding flow refers to the set of rules and decisions that determine how network devices handle incoming packets without inspecting packet and traffic contents. A forwarding flow involves making decisions based on information such as destination IP address, media access control (MAC) address, and routing tables to determine the outgoing interface for the packet and typically includes actions like address resolution (e.g., ARP for IP to MAC address mapping), updating MAC tables, and forwarding the packet to the appropriate interface, and various rules to apply based on configuration and policy.

A proxy flow comprises both forward proxy and reverse proxy functions and inspects the content of encrypted flows and access control. In some aspects, the cloud security platform 104 decrypts encrypted traffic to ensure malicious actors are not exploiting vulnerabilities in TLS-encrypted applications, and prevents data exfiltration (e.g., DLP) or connection to inappropriate URLs.

The cloud security platform 104 is also configured to handle packets differently based on security, such as policy related to IPS and a web application firewall (WAF). WAF protects various web applications from online threats, such as SQL injection, cross-site scripting (XSS), authentication spoofing, and other potential security. For example, a WAF filters and monitors traffic by inspecting headers (e.g., a JSON-encoded object in an HTTP header).

The cloud security platform 104 provides real-time discovery of multi-cloud workloads, at-scale, for virtual private clouds (VPCs) and cloud accounts. Real-time discovery also enables finding security gaps and improving defensive posture. The cloud security platform 104 also provides a data-plane management using gateways (e.g., the gateway 250 in FIG. 2) that provides self-healing via in-band/transparent diagnostics), seamless upgrade (e.g., no downtime or user intervention), and auto-scaling. The cloud security platform 104 may implement a containerized service (e.g., Kubernetes) to enable scale out deployments with a high service level agreement (SLA) without having to maintain network security infrastructure and integrate with cloud-native networking to enable automation of distributed and centralized (hub-n-spoke) architectures for ingress, egress, east-west (including microsegmentation) and hybrid cloud configurations. The cloud security platform 104 maintains traffic within cloud account boundaries and customers retain control of their private encryption keys without needing to share encryption keys with the control plane (e.g., the controller 210 of FIG. 2).

Figure 2:
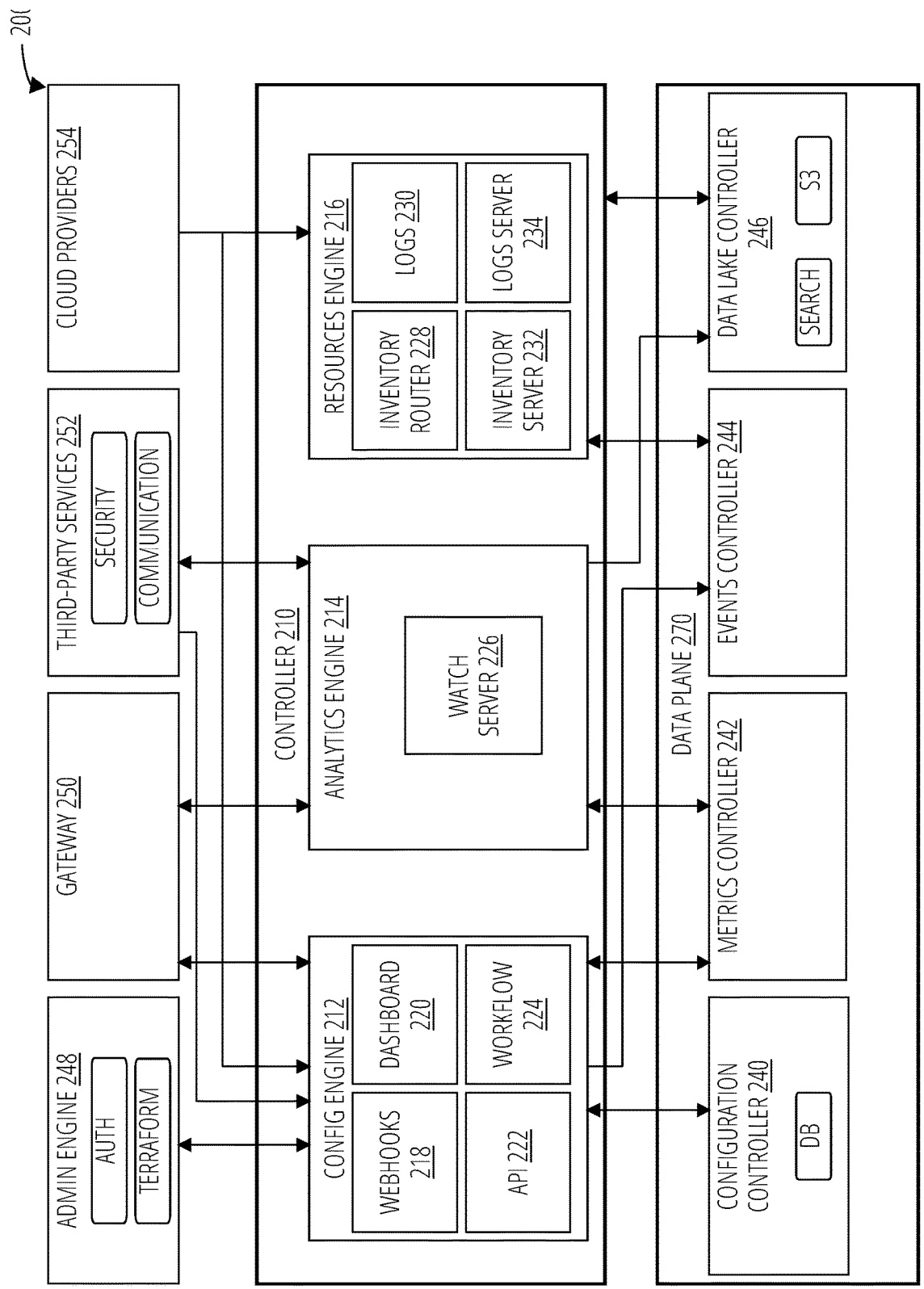
FIG. 2 is a conceptual diagram of a cloud security platform that integrates into different cloud service providers in accordance with some aspects of the present technology.

FIG. 2 is a conceptual diagram of a cloud security platform that integrates into different cloud service providers in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

In some aspects, the cloud security platform 200 separates compute and data storage functions and enables a multi-tenancy to support different customers while maintaining data separation when needed. For example, the compute components are separated into a controller 210 and data storage components are implemented in a data plane 270. The controller 210 may be a collection of Kubernetes-based services that deploy a low latency connection (e.g., gRPC) to connect various endpoints and enable bidirectional streaming, preventing connection setup and teardown. Each service within the controller 210 scales up or down horizontally based on load.

The controller 210 includes a configuration engine 212, an analytics engine 214, and a resources engine 216. The configuration engine 212 configures the various components and provides various services such as webhooks 218, a dashboard 220, an API 222, and a workflow 224.

In one aspect, the webhooks 218 module configures an asynchronous method of communication between different applications or services in real-time. In a webhook configuration, one application can register an endpoint URL with another, specifying where it should send data when a particular event occurs. When the event triggers, the originating system automatically pushes data to the registered URL, allowing the receiving application to process and act upon the information immediately. In some aspects, the webhooks 218 modules implement an observer pattern, with a dependent component providing a URL to the observed data source.

The dashboard 220 provides a user experience to a customer of the cloud security platform 104 and provides various integration modules, onboarding platforms, monitoring tools, and other functions for customers to access.

In some aspects, the APIs 222 can be various libraries to interact with various services, either through a dashboard 220 interface, a command line interface (not shown), or other tooling (not shown). The APIs 222 can also be API endpoints of the cloud security platform 104 or an API library associated with a third-party service (e.g., third-party services 252), or APIs associated with the cloud providers 254. In one aspect, the APIs 222 can include an agnostic API library that is configured to interact with the cloud providers 254 using a single API interface to scale resources, respond to security incidents, or other functions. This API 222 can be accessed via a command line interface or may be distributed to customers via various package management services.

The workflow 224 module can be various components that enable a customer to perform various tasks, such as manage specific resources, deploy services, communicate with team members regarding issues, and so forth. For example, the workflow 224 module can interact with the gateways 250 and an administration engine 248 to manage resources, access to resources, and deployment of various resources (e.g., deploy infrastructure with Terraform).

The analytics engine 214 is configured to integrate with gateways 250 and various third-party services 252 to monitor various events, services, and other operations. The analytics engine 214 includes a watch server 226 that is configured to disambiguate information from multiple sources of information (e.g., the gateway 250, the third-party services 252, etc.) to provide a wholistic view of cloud networking operations. The analytics engine 214 may also be configured to interact with various components of the data plane 270 such as a metrics controller 242 and a data lake controller 246.

In some aspects, the resources engine 216 receives resources from cloud providers 254 and includes various components to route information and store information. The resources engine 216 includes an inventory router 228, logs 230 (e.g., a cache of logs for various function), an inventory server 232, and a logs server 234. The components of the resources engine 216 are configured to disambiguate and combine information in agnostic and standardized manner and store various resources in the data plane 270. For example, the resources engine 216 stores and receives events from an events controller 244 and also stores and receives logs in the data lake controller 246. In some aspects, the inventory router 228 and the inventory server 232 build an evergreen model of the customer's cloud accounts and subscriptions and create an address object for security policy management for the cloud security platform 200. The address object represents a segment of the customer's subscription based on cloud native attributes (e.g., Security Group, ASG, customer-defined tags) and maps to a collection of IP Addresses which is automatically refreshed and synchronized with the gateway 250.

The data plane 270 includes various components to separate various types of information associated with the control plane and interconnected third-party services 252 and cloud providers 254. For example, the data plane 270 includes a configuration controller 240 that stores inventory information of a customer and various configuration information. In one example, the cloud providers 254 use different metrics for decisions pertaining to scaling deployed resources, and the configuration controller 240 stores information that allows the controller 210 to scale resources within the cloud providers 254 in a standardized manner. In some aspects, the configuration controller 240 may include storage mechanisms such as a relational database, a document database, and other high-availability storage mediums. The storage mechanisms can be on-premises resources or off-premises or cloud-based solutions such as various cloud-based relational or document databases (e.g., Redis, MySQL, MongoDB, etc.).

The data plane 270 also includes a metrics controller 242 that is configured to interact with custom metrics data or a third-party service for metrics analysis (e.g., Amazon Cloud-Watch). The events controller 244 is configured to handle and store events and various queues. For example, the events controller can include a Kafka server for handling real-time data feeds and event-driven applications. The metrics controller 242 may use a publish-subscribe model in which producers (e.g., a third-party service, an internal components of the controller 210, a gateway 250, etc.) publish data streams and a consumer subscribes to receive and process these streams in a fault-tolerant and distributed manner. The metrics controller 242 may handle massive amounts of data with low latency and high throughput.

The data lake controller 246 provides a long-term and scalable storage mechanism and associated services. For example, the data lake controller 246 may include a cloud-based S3 API for storing to various cloud services (e.g., AWS, DigitalOcean, OpenShift) or on-premises services (e.g., MinIO, etc.). The data lake controller 246 may also include a search-based mechanism such as ElasticSearch for large-scale and efficient search of contents within the non-volatile cloud storage mechanisms. In some aspects, the data lake controller 246 stores network logs and implements search functionality (e.g., Snowflake) for large-scale ad hoc queries for security research and analysis.

The cloud security platform 200 also includes an administration engine 248, a gateway 250, and integrations into various third-party services 106. The administration engine 248 may include authentication services (e.g., Auth0, Okta) to verify identity and provide authentication mechanisms (e.g., access tokens), and may include infrastructure as code (IaC) tools such as Terraform to automate the process of creating, updating, and managing the specified infrastructure across various cloud providers or on-premises environments.

The cloud security platform 200 includes gateways 250 that are deployed into various integration points, such as cloud providers. The gateways 250 an ingress and egress points of the cloud security platform 200 and are configured to monitor traffic, provide information to the controller 210, dynamically scale based on the cloud security platform 200, and provide security to a customer's cloud infrastructure. For example, the gateways 250 may implement a transparent forward and reverse proxy to manage traffic. The gateways 250 may also include a cloud-based firewall that is configured to filter malicious traffic using various dynamic detection policies.

The cloud security platform 200 also integrates into various third-party services 252 for various purposes such as receiving threat-related intelligence (e.g., Spunk, Talos, etc.). The third-party services 252 also include different types of infrastructure components such as managing mobile devices, implementing cloud-based multimedia communication services, business analytics, network analytics (e.g., reverse address lookup), certificate services, security information and event management (SIEM), and so forth.

Figure 3:
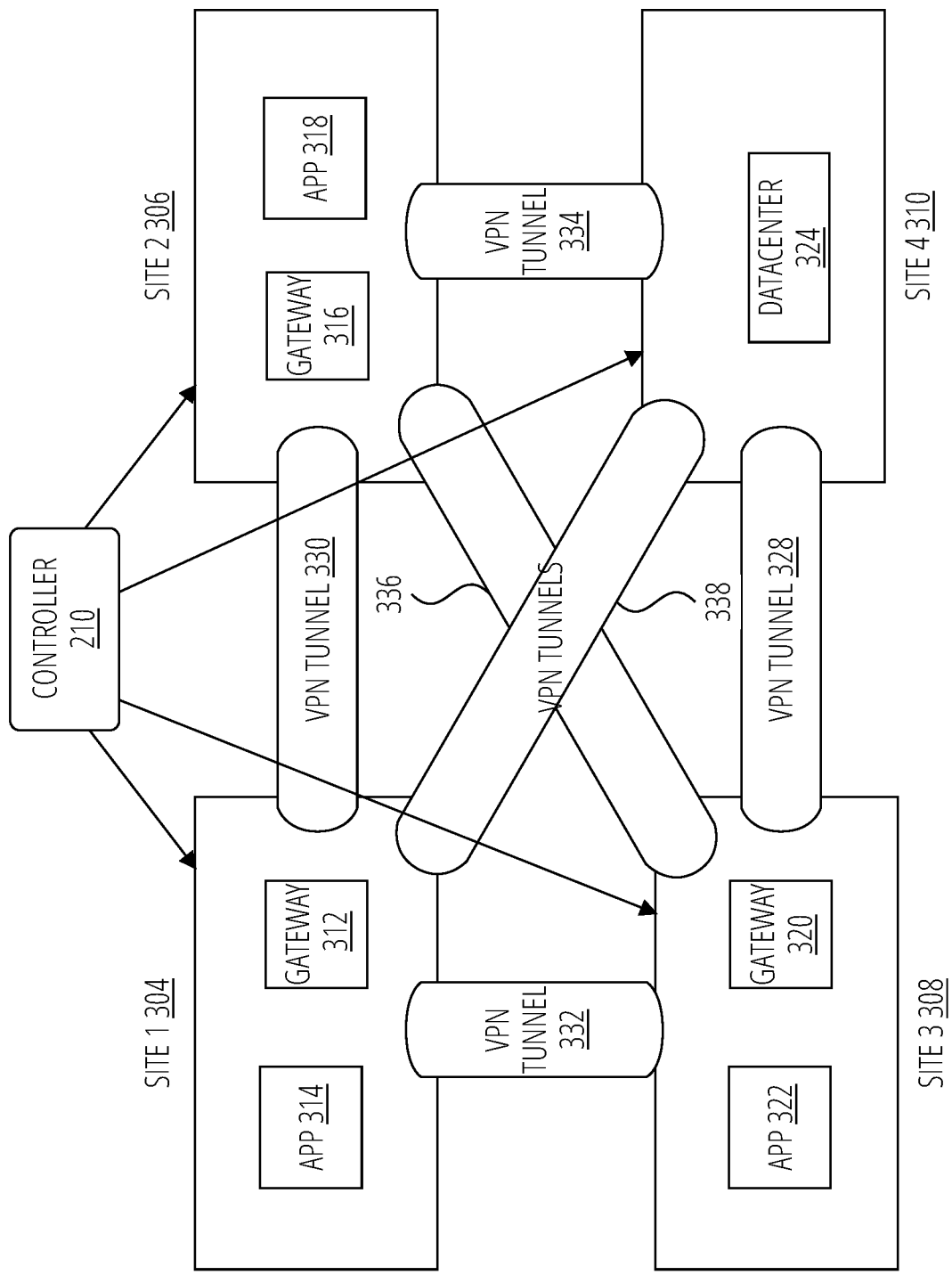
FIG. 3 illustrates an example system showing tunnels configured between sites in accordance with some aspects of the present technology.

FIG. 3 illustrates an example system showing tunnels configured between sites in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

Establishing connectivity to a data center and between hybrid and/or public clouds can present challenges. Accordingly, the present technology provides connectivity as a service. In order to facilitate connectivity as a service, the methods, systems, and techniques herein provide dynamically generated site-to-site connection between multiple cloud networks, which can make the process of connectivity simple, efficient, and secure. As described herein, connectivity can be provided as a service by only requiring a few inputs from an administrator, while a controller is configured to handle the complexity of interacting with the different sites.

As illustrated in FIG. 3, a network can include multiple sites such as site 1 304, site 2 306, site 3 308, and site 4 310. Site 4 310 is an example of an enterprise datacenter 324 hosting an enterprise private cloud, while site 1 304, site 2 306, and site 3 308 are examples of public clouds configured as virtual private clouds (VPC). Virtual private cloud sites can utilize virtualized gateways (such as gateway 312, gateway 316, and gateway 320) associated with virtual routers, wherein the datacenter 324 can utilize a physical router or a virtualized gateway.

An administrator can utilize the controller 210 to manage aspects of the sites (304, 306, 308, 310) by providing credentials to access the sites. In general, the credentials can provide read-only permissions to facilitate the discovery of components of one or more network sites, wherein components of the one or more network sites can include subnets, a gateway, a router, route tables, security groups, network address translation (NAT) instances, applications, etc. However, credentials can be provided to provide management of limited components of the sites. For example, management credentials can be provided to manage the gateways and to create and destroy tunnels.

The controller 210 can be a multi-tenanted controller, whereby administrators of different networks can access the controller 210 to perform services on behalf of their networks. One such service is the connectivity of cloud sites, which is the focus of the present technology. As described herein, the controller 210 can discover components of the sites to which it has been given credentials. The controller 210 can provide a user interface such as illustrated in FIG. 5A-FIG. 5E for the purposes of setting up connections between the sites (site 1 304, site 2 306, site 3 308, and site 4 310, etc.). As described herein the interface can be populated with gateway device or router in the respective site for selection. The controller is configured to automatically create a tunnel between the selected devices. For example, the controller is configured to instantiate or destroy the tunnels between sites such as VPN Tunnel 328, VPN Tunnel 330, VPN Tunnel 332, VPN Tunnel 334, VPN Tunnel 336, and VPN Tunnel 338.

Additional details are described herein in the context of the processes and user interfaces to follow.

Figure 4:
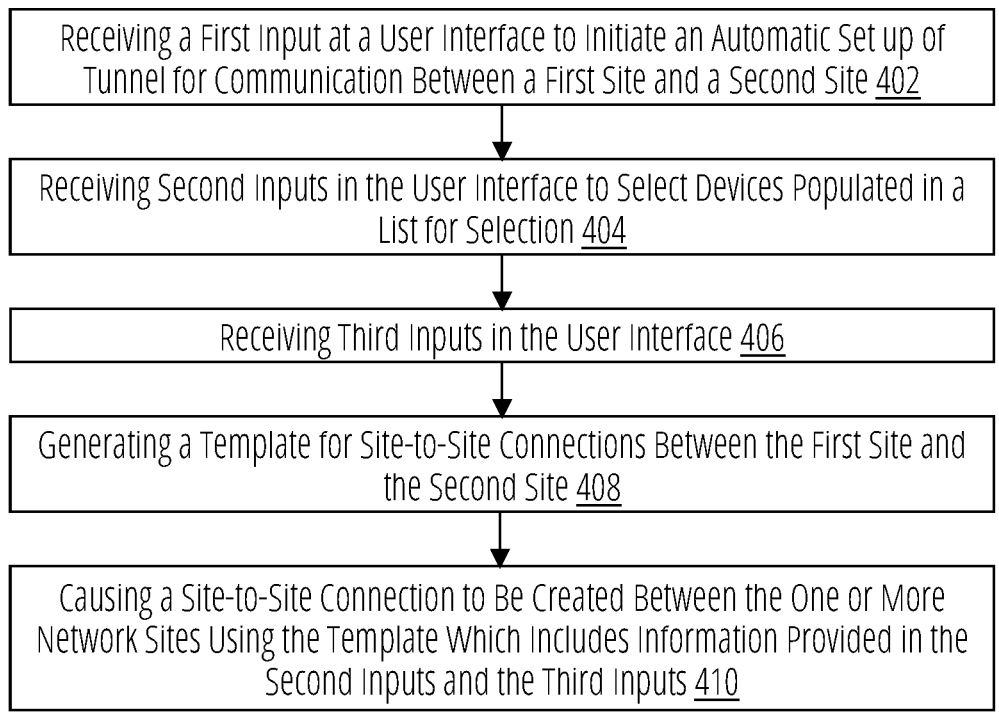
FIG. 4 illustrates an example process for dynamically connecting one or more network sites by a site connectivity service of a controller in accordance with some aspects of the present technology.

FIG. 4 illustrates an example process for dynamically connecting one or more network sites by a site connectivity service of a controller in accordance with some aspects of the present technology. Although the example process depicts a particular sequence of operations, the sequence may be altered without departing from the scope of the present disclosure. For example, some of the operations depicted may be performed in parallel or in a different sequence that does not materially affect the function of the process. In other examples, different components of an example device or system that implements the process may perform functions at substantially the same time or in a specific sequence.

According to some examples, the method includes receiving a first input at a user interface to initiate an automatic setup of a tunnel for communication between a first site and a second site at block 402. For example, the controller 210 illustrated in FIG. 2 may receive a first input at a user interface to initiate an automatic setup of a tunnel for communication between a first site and a second site. An example of the user interface is the site connectivity user interface 502 illustrated in FIG. 5A, and an example of the first input is a selection of the create connection button 504.

According to some examples, the method includes receiving second inputs in the user interface to select devices populated in a list for selection at block 404. For example, the controller 210 illustrated in FIG. 2 may receive second inputs in the user interface to select devices populated in a list for selection. An example of the user interface is the connection configuration interface 510 illustrated in FIG. 5B. The connection configuration interface 510 can be a progression of the site connectivity user interface 502, or a overlay window displayed with the site connectivity user interface 502. The second inputs are received by the first device selection list 514 and the second device selection list 516.

The second inputs are effective to select the devices at the first site and the second site which will form respective connection points for the site-to-site connection. In some embodiments, the devices gateways. The devices are populated in the list for selection by the controller 210 having access to the one or more network sites. The controller 210 automatically discovers existing components of the one or more network sites, and can list the relevant devices for establishing the connection in the first device selection list 514 or second device selection list 516.

According to some examples, the method includes receiving third inputs in the user interface at block 406. For example, the controller 210 illustrated in FIG. 2 may receive third inputs in the user interface. The third inputs are effective to input settings for use in connecting the selected devices at the first site and the second site. An example of the user interface is the connection configuration interface 510 illustrated in FIG. 5B. The third inputs are received by authentication method list 518, authentication value field 520, and IP Sec profile list 522. Settings for use in connecting the selected devices at the first site and the second site include a selection IP Sec, and authentication information. Additionally, if the devices utilize other settings, such as a BGP profile, the controller can extract these from the device settings (e.g., Gateway settings).

These inputs (the device at the first site, the device at the second site, and settings such as authentication information and IPSec are the only information that an administrator needs to provide to the controller 210. Even though different sites might be hosted by different cloud providers that might use different technologies, the controller and the user interfaces are the same. The user interface and controller 210 provide an abstraction layer to configure the site-to-site connection in the same way regardless of the protocols and configurations of the first site and the second site. The protocols and configurations of the first site and the second site are transparent to a user providing the inputs; for example, AMAZON WEB SERVICES (AWS) has a transit gateway-based architecture to connect VPC, AZURE has virtual network (VNET) peering, and GOOGLE CLOUD PLATFORM (GCP) has VPC peering.

The controller 210 can also identify potential problems that might arise from connecting the first site and the second site such as might arise if the sites are using overlapping address ranges. In such an example, the controller 210 can automatically configure network address translation (NAT) to prevent conflicts from overlapping IP addresses at the first site and the second site.

According to some examples, the method includes generating a template for site-to-site connections between the first site and the second site at block 408. For example, the controller 210 illustrated in FIG. 2 may generate a template for site-to-site connections between the first site and the second site from the selected devices at the first site and the second site, the first site-specific protocols and configurations, and the second site-specific protocols and configurations, any NAT and other configurations or services beneficial in instantiating a tunnel between the first site and the second site.

According to some examples, the method includes causing a site-to-site connection to be created between the one or more network sites using the template at block 410. For example, the controller 210 illustrated in FIG. 2 may cause a site-to-site connection to be created between the one or more network sites using the template for creating connections between the first site and the second site. The site-to-site connection is a tunnel between the selected devices at the first and second sites.

When a site has multiple gateways that need to be connected, VPNs can be configured to optimize use of resources and to prevent over-utilization of a particular gateway instance. To illustrate, consider a site-to-site connection between site1-gw and site2-gw. If site1-gw has instances A and B, and site2-gw has instances C and D, the controller 210 will configure the VPN tunnels as A-C and B-D instead of A-C and A-D, which would overload A and leave B unused. More specifically, if there is a site-to-site connection from site1-gw to site2-gw, a site1-gw has instances A, B, and site2-gw has instances C,D, the controller 210 will configure the tunnels as A-C and B-D, and not A-C and A-D making A overloaded and B completely free.

Figure 6:
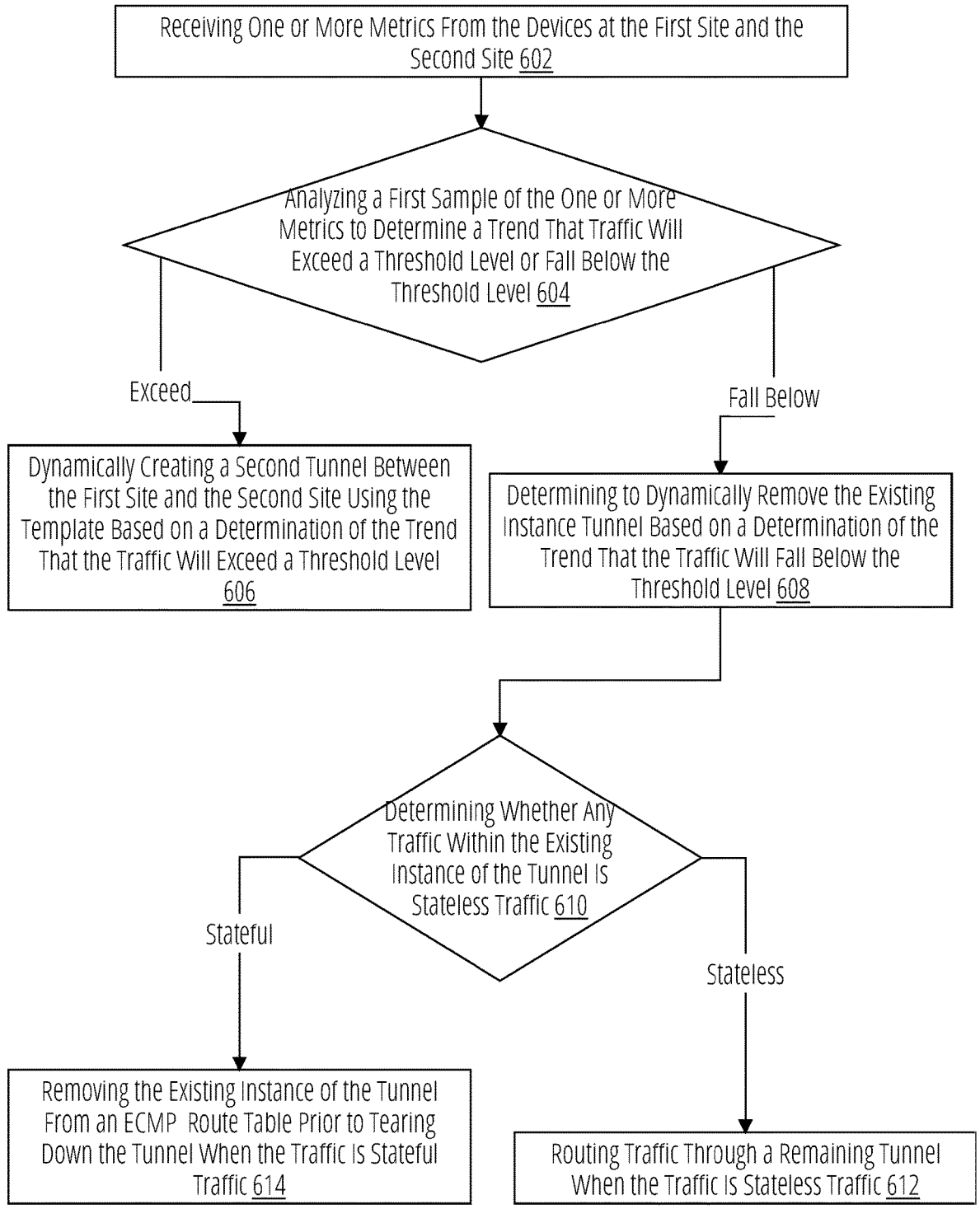
FIG. 6 illustrates an example process for automatically scaling the connection capacity between two sites in accordance with some aspects of the present technology.

Accordingly, as is addressed in greater detail with respect to FIG. 6, the present technology helps with scaling of resources by allowing new instances of gateway to be instantiated, and to tear down underutilized existing instances. As new gateways are instantiated, new tunnels can be created by the controller using the template for creating tunnels to distribute the load across multiple tunnels. Likewise, when a gateway is to be torn down, the controller can first create a new tunnel using gateways that will remain so that connections between the sites remain even after the gateway and tunnels anchored to that gateway are torn down. The controller can also aid in migrating traffic away from the gateway and tunnel to be torn down to the new tunnel and remaining gateway.

The creating the site-to-site connection includes interacting with the first site using first site-specific protocols and configurations and interacting with the second site using second site-specific protocols and configurations.

The site-to-site connection can apply to one or more network topologies, whether fully meshed or layered with a hub-and-spoke kind of topology. Setting up automatic/dynamic site-to-site connectivity and maintaining this connectivity in a highly resilient and scalable manner is important for application connectivity and availability.

When BGP is part of the settings for use in connecting the selected devices at the first site and the second site, the site-to-site connection is learned and added to the ECMP routing table.

Figure 5A:
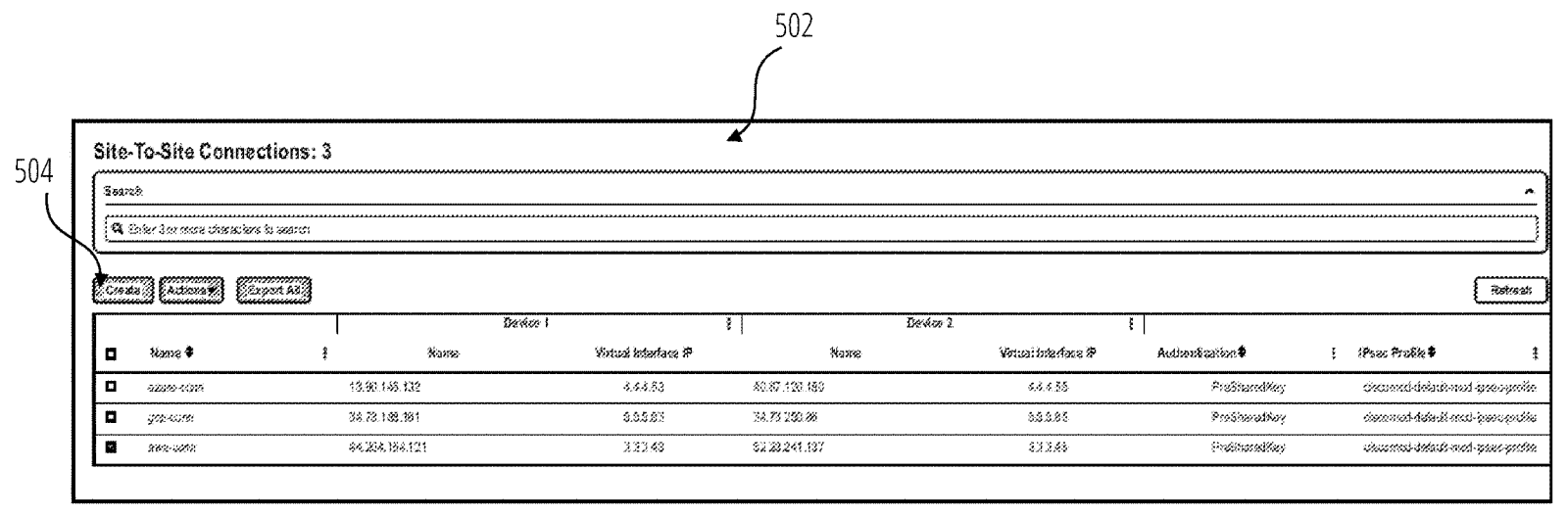
Figure 5B:
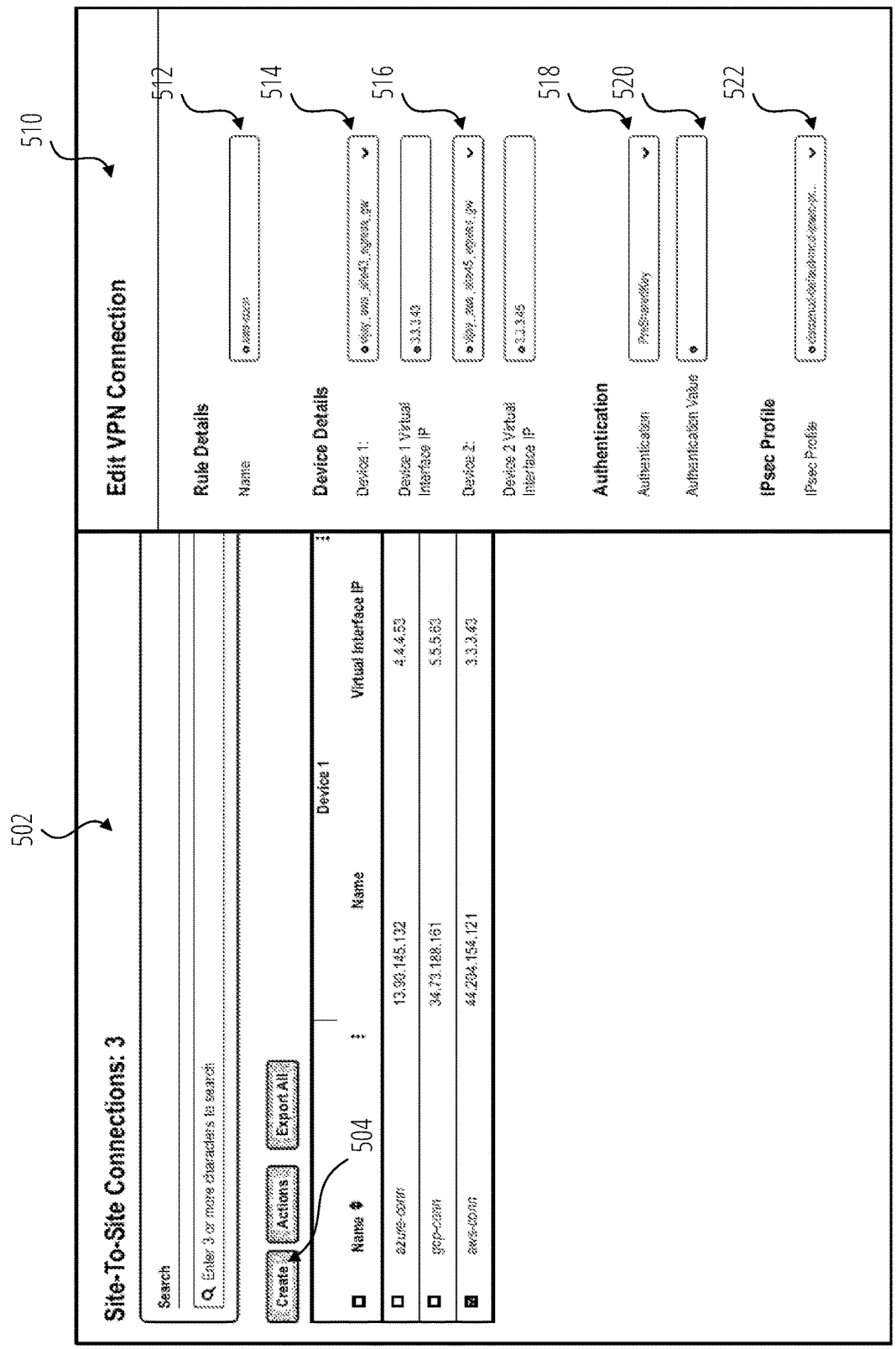
FIG. 5B illustrates an example of a connection configuration interface and settings received therein in accordance with some aspects of the present technology.

FIG. 5A illustrates an example site connectivity user interface 502 in accordance with some aspects of the present technology. The site connectivity user interface 502 lists instances of tunnels connecting a first device at a first site with a second device at a second site in rows of a table. This site connectivity user interface 502 also includes a create connection button 504, which when selected can launch a connection configuration interface 510 such as that illustrated in FIG. 5B.

FIG. 5B illustrates an example of a connection configuration interface and settings received therein in accordance with some aspects of the present technology. The connection configuration interface 510 can be a progression of the site connectivity user interface 502 or an overlay window displayed with the site connectivity user interface 502. When the term user interface is used without specifying the site connectivity user interface 502 or the connection configuration interface 510, the term user interface is intended to refer to one or both user interfaces.

The connection configuration interface 510 is configured to receive a connection name 512 which is a name used to identify the connection between the first site and the second site.

The connection configuration interface 510 is configured to receive second inputs and third inputs. The second inputs are a selection of a first device at a first site and a second device3 at a second site, and the selections can be received by the first device selection list 514 and the second device selection list 516. The first device and the second device are routers or gateways that are used as the respective endpoints of a tunnel between the first site and the second site.

The connection configuration interface 510 is also configured to receive any authentication method and authentication value needed to establish the authentication. For example, authentication method list 518 is configured to receive an authentication mechanism, which, as illustrated is a pre-shared key, and authentication value field 520 is configured to receive a value used to derive the pre-shared key.

The connection configuration interface 510 is also configured to receive an input selecting a IPSec Profile in IP Sec profile list 522 to be applied to a tunnel created by the present technology. While other technologies are possible to secure communication tunnels, IP Sec is the most popular and is supported in this interface, but the interface could easily list other tunnel protocols. The IPSec profiles can define parameters such as security settings, key exchange, security associations, mode selections, policies, etc. If an IP Sec profile is not already established to be selected, the present technology can automatically configure and IPSec profile.

FIG. 6 illustrates an example process for automatically scaling the connection capacity between two sites in accordance with some aspects of the present technology. Although the example process depicts a particular sequence of operations, the sequence may be altered without departing from the scope of the present disclosure. For example, some of the operations depicted may be performed in parallel or in a different sequence that does not materially affect the function of the process In other examples, different components of an example device or system that implements the process may perform functions at substantially the same time or in a specific sequence.

The site connectivity service not only creates initial connections between sites, it also handles the scaling, maintenance, and repair of tunnels between sites. As a fundamental benefit of cloud computing is the ability to scale resources within the cloud, it also stands to reason that bandwidth to a cloud resource, such as an application hosted at a site, might also need to increase. The site connectivity service provided by the controller 210 can handle such scaling up, and scaling down, as-needed.

Additionally, tunnels can also require occasional maintenance due to any number of problems or changing configurations and can benefit from redundancy. The site connectivity service provided by controller 210 can handle such redundancy, maintenance, and repair since the controller 210 continues to receive updates about changing conditions and configurations in the sites.

According to some examples, the method includes receiving one or more metrics from the devices at the first site and the second site at block 602. For example, the controller 210 illustrated in FIG. 2 may receive one or more metrics from the devices at the first site and the second site. Wherein the one or more metrics provide information about a health and a load for an existing instance of a tunnel between the selected devices at the first and second sites.

Figure 7:
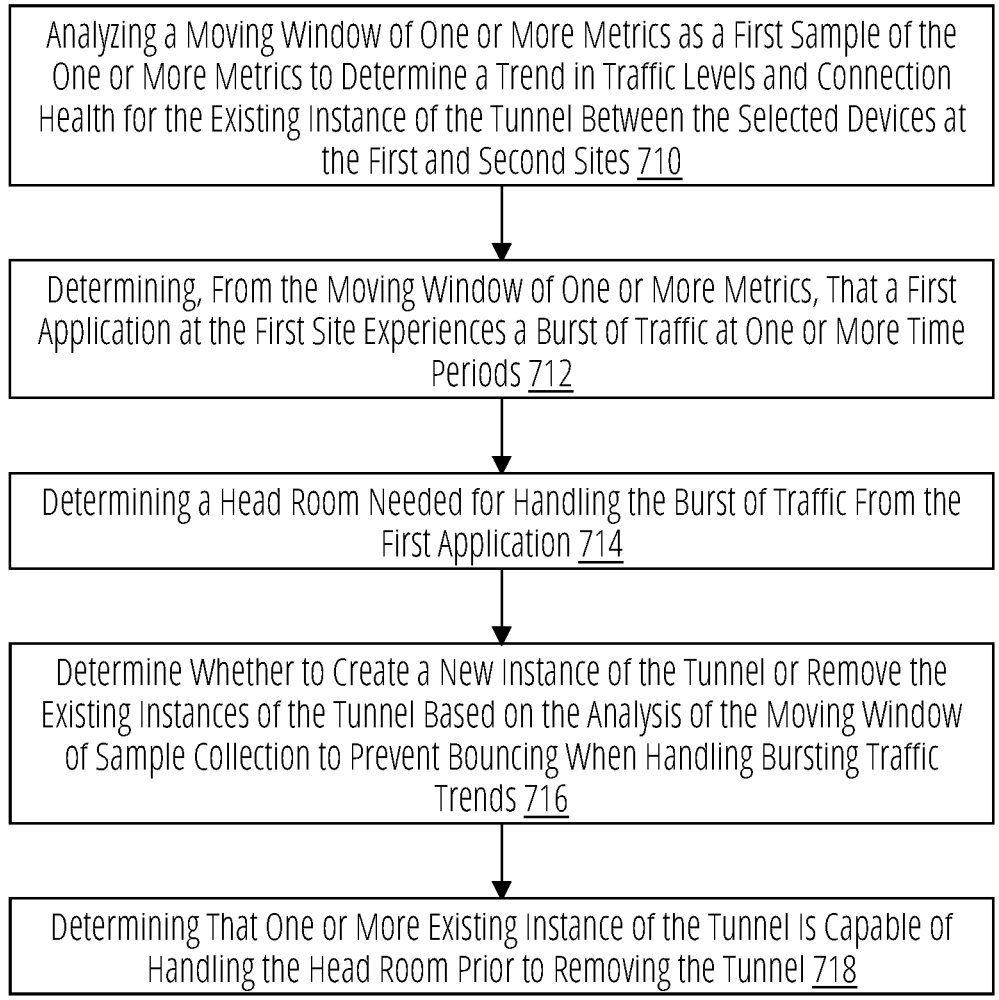
FIG. 7 illustrates an example process for making the determination of a trend that traffic will exceed a threshold level or fall below the threshold level in accordance with some aspects of the present technology.

According to some examples, the method includes analyzing a first sample of the one or more metrics to determine a trend that traffic will exceed a threshold level or fall below the threshold level at decision block 604. For example, the controller 210 illustrated in FIG. 2 may analyze a first sample of the one or more metrics to determine a trend that traffic will exceed a threshold level or fall below the threshold level. FIG. 7 illustrates additional detail for making the determination of the trend represented at decision block 604 in accordance with some aspects of the present technology.

According to some examples, the method includes dynamically creating a second tunnel between the first site and the second site using the template based on a determination of the trend that the traffic will exceed a threshold level at block 606. For example, controller 210, illustrated in FIG. 2, may dynamically create a second tunnel between the first site and the second site using the template based on a determination of the trend that the traffic will exceed a threshold level.

According to some examples, the method includes determining to dynamically remove the existing instance tunnel based on a determination of the trend that the traffic will fall below the threshold level at block 608. For example, controller 210, illustrated in FIG. 2, may determine to dynamically remove the existing instance tunnel based on a determination of the trend that the traffic will fall below the threshold level.

While instantiating a new tunnel can be done without regard for the handling of the existing traffic, tearing down a tunnel requires a bit more analysis. According to some examples, the method includes determining whether any traffic within the existing instance of the tunnel is stateless traffic at decision block 610. For example, the controller 210 illustrated in FIG. 2 may determine whether any traffic within the existing instance of the tunnel is stateless traffic. If the traffic is stateless, the tunnel can be torn down without consideration of other factors because even if some packets are lost while traffic between the sites is re-routed, it will not affect the state of the application, and existing error correction techniques that compensate for lost packets will compensate for the lost packets.

But for stateful traffic, according to some examples, the method includes routing traffic through a remaining tunnel at block 612. For example, controller 210, illustrated in FIG. 2, may route traffic through a remaining tunnel when the traffic is stateless traffic to ensure the state of the application is preserved.

According to some examples, the method includes removing the existing instance of the tunnel from an ECMP route table prior to tearing down the tunnel when the traffic is stateful traffic at block 614. For example, controller 210, illustrated in FIG. 2, may remove the existing instance of the tunnel from an ECMP route table prior to tearing down the tunnel when the traffic is stateful traffic.

FIG. 7 illustrates an example process for making the determination of a trend that traffic will exceed a threshold level or fall below the threshold level in accordance with some aspects of the present technology. Although the example process depicts a particular sequence of operations, the sequence may be altered without departing from the scope of the present disclosure. For example, some of the operations depicted may be performed in parallel or in a different sequence that does not materially affect the function of the process. In other examples, different components of an example device or system that implements the process may perform functions at substantially the same time or in a specific sequence.

While FIG. 6 acknowledges that new tunnels should be instantiated when traffic flowing over existing tunnels is increasing and that existing tunnel instances should be removed when there is too much excess capacity, the process illustrated in FIG. 7 illustrates that the determination to add or tear down a tunnel can be more nuanced. It would be a waste of resources and would potentially cause negative performance metrics in the network if tunnels were capriciously added and removed. Tunnels should not be added or removed in response to short-lived fluctuations in bandwidth and latency. For example, some applications cause bursty traffic that might briefly cause it to appear that a threshold has been exceeded, but that traffic will quickly disappear such that a new tunnel would be formed too late to handle the increased burst of traffic and would result in too much extra capacity for the more persistent traffic.

According to some examples, the method includes analyzing a moving window of one or more metrics as a first sample of the one or more metrics to determine a trend in traffic levels and connection health for the existing instance of the tunnel between the selected devices at the first and second sites at block 710. For example, the controller 210 illustrated in FIG. 2 may analyze a moving window of one or more metrics as a first sample of the one or more metrics to determine a trend in traffic levels and connection health for the existing instance of the tunnel between the selected devices at the first and second sites.

According to some examples, the method includes determining, from the moving window of one or more metrics, that a first application at the first site experiences a burst of traffic at one or more time periods at block 712.

According to some examples, the method includes determining a head room needed for handling the burst of traffic from the first application at block 714. For example, the controller 210 illustrated in FIG. 2 may determine a head room needed for handling the burst of traffic from the first application.

According to some examples, the method includes determining whether to create a new instance of the tunnel or remove the existing instances of the tunnel based on the analysis of the moving window of sample collection to prevent bouncing when handling bursting traffic trends at block 716. For example, the controller 210 illustrated in FIG. 2 may determine whether to create a new instance of the tunnel or remove the existing instances of the tunnel based on the analysis of the moving window of sample collection to prevent bouncing when handling bursting traffic trends.

According to some examples, the method includes determining that one or more existing instance of the tunnel is capable of handling the head room prior to removing the tunnel at block 718. For example, the controller 210 illustrated in FIG. 2 may determine that one or more existing instance of the tunnel is capable of handling the head room prior to removing the tunnel. Wherein the head room ensures that removing the tunnel between the first site and the second site does not create bouncing of traffic between capriciously added and removed tunnels.

Figure 8:
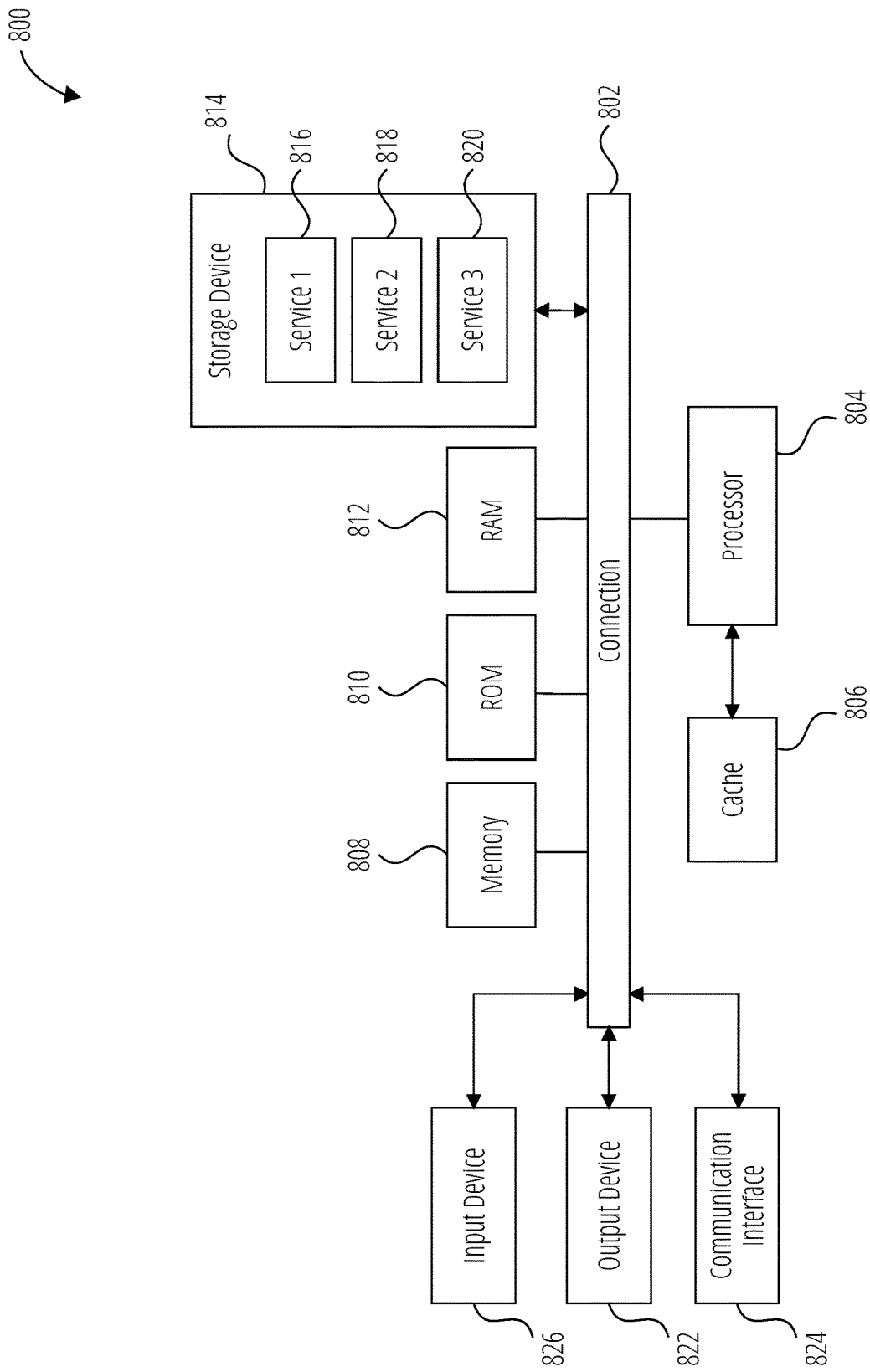
FIG. 8 shows an example of a system for implementing certain aspects of the present technology.

FIG. 8 shows an example of computing system 800, which can be for example any computing device making up gateway 250, controller 210, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random access memory (RAM) 812 to processor 804. Computing system 800 can include a cache of high-speed memory 806 connected directly with, in close proximity to, or integrated as part of processor 804.

Processor 804 can include any general purpose processor and a hardware service or software service, such as services 816, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the necessary hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects:

The present technology includes computer-readable storage mediums for storing instructions, and systems for executing any one of the methods embodied in the instructions addressed in the aspects of the present technology presented below:

Aspect 1. A method comprising: receiving a first input at a user interface to initiate an automatic set up of tunnel for communication between a first site and a second site; receiving second inputs in the user interface to select devices populated in a list for selection, wherein the second inputs are effective in selecting the devices at the first site and the second site which will form respective connection points for a site-to-site connection, wherein the devices are routers or gateways to which a respective router is associated; receiving third inputs in the user interface, wherein the third inputs are effective to input settings for use in connecting the selected devices at the first site and the second site; causing the site-to-site connection to be created between the one or more network sites using the settings, wherein the site-to-site connection is a tunnel between the selected devices at the first and second sites, wherein the creating the site-to-site connection includes interacting with the first site using first site-specific protocols and configurations and interacting with the second site using second first site-specific protocols and configurations.

Aspect 2. The method of aspect 1, wherein the devices are populated in the list for selection by a controller having access to the one or more network sites.

Aspect 3. The method of any of aspects 1-2, the method further comprising: generating a template for site-to-site connections between the first site and the second site, the template is created from the input settings for use in connecting the selected devices at the first site and the second site, the first site-specific protocols and configurations, and the second site-specific protocols and configurations Aspect 4. The method of any of aspects 1-3, wherein settings for use in connecting the selected devices at the first site and the second site include a selection of BGP, and/or IP Sec.

Aspect 5. The method of any of aspects 1-4, the method further comprising: receiving one or more metrics from the devices at the first site and the second site, wherein the one or more metrics provide information about a health and a load for an existing instance of tunnel between the selected devices at the first and second sites; analyzing a first sample of the one or more metrics to determine a trend that traffic will exceed a threshold level; and dynamically creating a second tunnel between the first site and the second site using the template based on a determination of the trend that the traffic will exceed a threshold level.

Aspect 6. The method of any of aspects 1-5, the method further comprising: receiving one or more metrics from the devices at the first site and the second site, wherein the one or more metrics provide information about a health and a load for an existing instance of tunnel between the selected devices at the first and second sites; analyzing a sample of the one or more metrics to determine a trend that traffic will fall below a threshold level; and dynamically removing the existing instance tunnel based on a determination of the trend that the traffic will fall below the threshold level.

Aspect 7. The method of any of aspects 1-6, the method further comprising: determining whether any traffic within the existing instance of the tunnel is stateless traffic; routing traffic through a remaining tunnel when the traffic is stateless traffic; and removing the existing instance of the tunnel from an ECMP route table prior to tearing down the tunnel when the traffic is stateful traffic.

Aspect 8. The method of any of aspects 1-7, the method further comprising: receiving one or more metrics from the devices at the first site and the second site, wherein the one or more metrics provide information about a health and a load for an existing instance of tunnel between the selected devices at the first and second sites; analyzing a moving window of one or more metrics as a first sample of the one or more metrics to determine a trend in traffic levels and connection health for the existing instance of the tunnel between the selected devices at the first and second sites; and determine whether to create a new instance of the tunnel or remove the existing instances of the tunnel based on the analysis of the moving window of sample collection to prevent bouncing when handling bursting traffic trends.

Aspect 9. The method of any of aspects 1-8, the method further comprising: determining, from the moving window of one or more metrics, that a first application at the first site experiences a burst of traffic at one or more time periods; determining a head room needed for handling the burst of traffic from the first application; determining that one or more existing instance of the tunnel is capable of handling the head room prior to removing the tunnel.

Aspect 10. The method of any of aspects 1-9, the method further comprising: automatically configuring a network address translation (NAT) by the controller to prevent conflicts from overlapping IP addresses at the first site and the second site, wherein the NAT is included in the template for site-to-site connections between the first site and the second site.

Aspect 11. The method of any of aspects 1-10, the method further comprising: when BGP is part of the settings for use in connecting the selected devices at the first site and the second site, the site-to-site connection is learned and added to an equal cost multi-path (ECMP) routing table.

What is claimed is:

1. A method comprising:
   receiving a first input at a user interface to initiate an automatic set up of tunnel for communication between a first site and a second site;
   receiving second inputs in the user interface to select devices populated in a list for selection, wherein the second inputs are effective in selecting the devices at the first site and the second site which will form respective connection points for a site-to-site connection, wherein the devices are routers or gateways to which a respective router is associated;
   receiving third inputs in the user interface, wherein the third inputs are effective to input settings for use in connecting the selected devices at the first site and the second site;
   causing the site-to-site connection to be created between one or more network sites using the settings, wherein the site-to-site connection is a tunnel between the selected devices at the first and second sites, wherein the creating the site-to-site connection includes interacting with the first site using first site-specific protocols and configurations and interacting with the second site using second site-specific protocols and the configurations.

2. The method of claim 1, wherein the causing the site-to-site connection to be created includes optimizing use of existing devices, the method comprising:
   determining that multiple instances of at least one of the selected devices exist at the first site;
   causing creation a first site-to-site connection using a first instance of the multiple instances of at least one of the selected devices to create a first tunnel to the second site; and
   causing creation of a second site-to-site connection using a second instance of the multiple instances of at least one of the selected devices to create a second tunnel to a third site.

3. The method of claim 1, wherein the devices are populated in the list for selection by a controller having access to the one or more network sites.

4. The method of claim 1, the method further comprising:
   generating a template for site-to-site connections between the first site and the second site, the template is created from the input settings for use in connecting the selected devices at the first site and the second site, the first site-specific protocols and configurations, and the second site-specific protocols and configurations.

5. The method of claim 4, the method further comprising:
   automatically configuring a network address translation (NAT) by a controller to prevent conflicts from overlapping IP addresses at the first site and the second site, wherein the NAT is included in the template for site-to-site connections between the first site and the second site.

6. The method of claim 4, the method further comprising:
   receiving one or more metrics from the devices at the first site and the second site, wherein the one or more metrics provide information about a health and a load for an existing instance of tunnel between the selected devices at the first and second sites;
   analyzing a first sample of the one or more metrics to determine a trend that traffic will exceed a threshold level; and
   dynamically creating a second tunnel between the first site and the second site using the template based on a determination of the trend that the traffic will exceed the threshold level.

7. The method of claim 1, wherein settings for use in connecting the selected devices at the first site and the second site include a selection of BGP, and/or IP Sec.

8. The method of claim 1, the method further comprising:
   receiving one or more metrics from the devices at the first site and the second site, wherein the one or more metrics provide information about a health and a load for an existing instance of the tunnel between the selected devices at the first and second sites;
   analyzing a sample of the one or more metrics to determine a trend that traffic will fall below a threshold level; and
   dynamically removing the existing instance of the tunnel based on a determination of the trend that the traffic will fall below the threshold level.

9. The method of claim 8, the method further comprising:
   determining whether any traffic within the existing instance of the tunnel is stateless traffic;
   routing traffic through a remaining tunnel when the traffic is stateless traffic; and
   removing the existing instance of the tunnel from an ECMP route table prior to tearing down the tunnel when the traffic is stateful traffic.

10. The method of claim 1, the method further comprising:
    receiving one or more metrics from the devices at the first site and the second site, wherein the one or more metrics provide information about a health and a load for an existing instance of tunnel between the selected devices at the first and second sites;

analyzing a moving window of one or more metrics as a first sample of the one or more metrics to determine a trend in traffic levels and connection health for the existing instance of the tunnel between the selected devices at the first and second sites; and determine whether to create a new instance of the tunnel or remove the existing instances of the tunnel based on an analysis of the moving window of sample collection to prevent bouncing when handling bursting traffic trends.

11. The method of claim 10, the method further comprising:

determining, from the moving window of one or more metrics, that a first application at the first site experiences a burst of traffic at one or more time periods;

determining a head room needed for handling the burst of traffic from the first application;

determining that one or more existing instance of the tunnel is capable of handling the head room prior to removing the tunnel.

12. The method of claim 1, the method further comprising:

when BGP is part of the settings for use in connecting the selected devices at the first site and the second site, the site-to-site connection is learned and added to an equal cost multi-path (ECMP) routing table.

13. A computing system comprising:

at least one processor; and a memory storing instructions that, when executed by the at least one processor, configure the system to:

receive a first input at a user interface to initiate an automatic set up of tunnel for communication between a first site and a second site;

receive second inputs in the user interface to select devices populated in a list for selection, wherein the second inputs are effective in selecting the devices at the first site and the second site which will form respective connection points for a site-to-site connection, wherein the devices are routers or gateways to which a respective router is associated;

receive third inputs in the user interface, wherein the third inputs are effective to input settings for use in connecting the selected devices at the first site and the second site;

cause the site-to-site connection to be created between one or more network sites using the settings, wherein the site-to-site connection is a tunnel between the selected devices at the first and second sites, wherein the creating the site-to-site connection includes interacting with the first site using first site-specific protocols and configurations and interacting with the second site using second site-specific protocols and configurations.

14. The computing system of claim 13, wherein the instructions further configure the system to:

generate a template for site-to-site connections between the first site and the second site, the template is created from the input settings for use in connecting the selected devices at the first site and the second site, the first site-specific protocols and configurations, and the second site-specific protocols and configurations.

15. The computing system of claim 14 wherein the instructions further configure the system to:

receive one or more metrics from the devices at the first site and the second site, wherein the one or more metrics provide information about a health and a load for an existing instance of tunnel between the selected devices at the first and second sites;

analyze a first sample of the one or more metrics to determine a trend that traffic will exceed a threshold level; and dynamically create a second tunnel between the first site and the second site using the template based on a determination of the trend that the traffic will exceed a threshold level.

16. The computing system of claim 13, wherein the instructions further configure the system to:

receive one or more metrics from the devices at the first site and the second site, wherein the one or more metrics provide information about a health and a load for an existing instance of tunnel between the selected devices at the first and second sites;

analyze a sample of the one or more metrics to determine a trend that traffic will fall below a threshold level; and dynamically remove the existing instance tunnel based on a determination of the trend that the traffic will fall below the threshold level.

17. The computing system of claim 13, wherein the instructions further configure the system to:

receive one or more metrics from the devices at the first site and the second site, wherein the one or more metrics provide information about a health and a load for an existing instance of tunnel between the selected devices at the first and second sites;

analyze a moving window of one or more metrics as a first sample of the one or more metrics to determine a trend in traffic levels and connection health for the existing instance of the tunnel between the selected devices at the first and second sites; and determine whether to create a new instance of the tunnel or remove the existing instances of the tunnel based on an analysis of the moving window of sample collection to prevent bounce when handling bursting traffic trends.

18. A non-transitory computer-readable storage medium, the computer-readable storage medium including instructions that when executed by at least one processor, cause the at least one processor to:

receive a first input at a user interface to initiate an automatic set up of tunnel for communication between a first site and a second site;

receive second inputs in the user interface to select devices populated in a list for selection, wherein the second inputs are effective in selecting the devices at the first site and the second site which will form respective connection points for a site-to-site connection, wherein the devices are routers or gateways to which a respective router is associated;

receive third inputs in the user interface, wherein the third inputs are effective to input settings for use in connecting the selected devices at the first site and the second site;

cause the site-to-site connection to be created between one or more network sites using the settings, wherein the site-to-site connection is a tunnel between the selected devices at the first and second sites, wherein the creating the site-to-site connection includes interacting with the first site using first site-specific protocols and configurations and interacting with the second site using second site-specific protocols and configurations.

19. The computer-readable storage medium of claim 18, wherein the instructions further configure the at least one processor to:
- generate a template for site-to-site connections between the first site and the second site, the template is created from the input settings for use in connecting the selected devices at the first site and the second site, the first site-specific protocols and configurations, and the second site-specific protocols and configurations.

20. The computer-readable storage medium of claim 19, wherein the instructions further configure the at least one processor to:
- receive one or more metrics from the devices at the first site and the second site, wherein the one or more metrics provide information about a health and a load for an existing instance of tunnel between the selected devices at the first and second sites;
- analyze a first sample of the one or more metrics to determine a trend that traffic will exceed a threshold level; and
- dynamically create a second tunnel between the first site and the second site using the template based on a determination of the trend that the traffic will exceed a threshold level.

* * * * *